Figure 1:
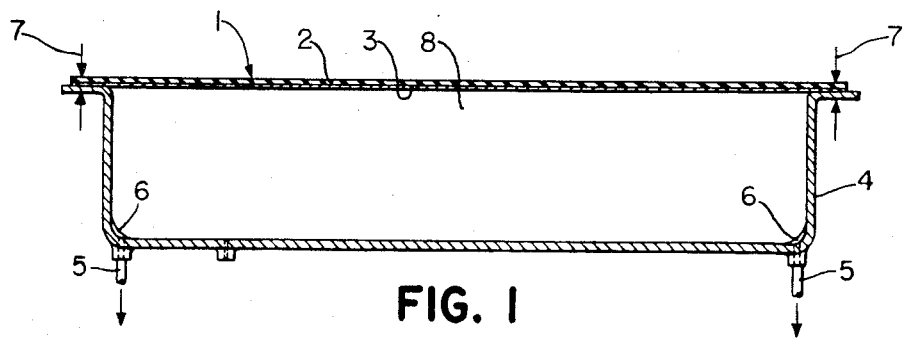

United States Patent [19]

Robinson

[11] 3,755,040

[45] Aug. 28, 1973

[54] CONTAINER FOR LIQUID HYDROCARBONS

[75] Inventor: Keith D. Robinson, Mogadore, Ohio

[73] Assignee: The Goodyear Tire & Rubber Company, Akron, Ohio

[22] Filed: Apr. 15, 1971

[21] Appl. No.: 134,167

[52] U.S. Cl................. 156/242, 156/285, 156/288, 156/289, 264/250
[51] Int. Cl............................................. B29c 1/14
[58] Field of Search.................. 156/156, 198, 242, 156/285, 287, 288, 289; 264/250, 251, 267, 268, 269; 53/7, 9, 18, 39

[56] References Cited
UNITED STATES PATENTS

| | | | |
|---|---|---|---|
| 1,270,873 | 7/1918 | Robertson........................... | 156/156 |
| 2,558,807 | 7/1951 | Bailey................................. | 156/242 |
| 2,584,632 | 2/1952 | Southwick.......................... | 156/289 |
| 3,446,686 | 8/1969 | Butler et al........................ | 156/285 X |
| 3,567,536 | 3/1971 | Wickersham..................... | 156/242 X |

Primary Examiner—Ralph S. Kendall
Assistant Examiner—Caleb Weston
Attorney—F. W. Brunner and H. C. Young, Jr.

[57] ABSTRACT

A container suitable for liquid hydrocarbons which comprises an internal pinched seam container having a hydrocarbon barrier as an inner liner. The container is prepared by releasably attaching first and second curable flexible sheets over the apertures of first and second concave molds, shaping the sheets by applying a pressure differential between the surface of each sheet facing its associated mold; after shaping the first sheet, providing an aperture therein through an aperture in the corresponding mold; adhering the peripheries of the two sheets together, before or after shaping the first sheet, and providing an opening in one of the sheets; curing the sheets after shaping to form a pinched seam container; removing the container from the molds; turning the container inside out through the provided opening therein; and sealing the said provided opening.

4 Claims, 5 Drawing Figures

Patented Aug. 28, 1973

3,755,040

2 Sheets—Sheet 1

CONTAINER FOR LIQUID HYDROCARBONS

This invention relates to a composite structure suitable for containing liquids and to a method of preparing such a composite structure.

Containers having flexible walls suitable for containing liquids and particularly for containing liquid hydrocarbons such as automobile gasoline tanks can be prepared by building the flexible structure around a building form and then removing the building form through a hole in the formed flexible structure. The structures also can be prepared by forming halves of a container inside a concave mold, removing the halves from the mold, ane then cementing or bonding the two halves together. All of these methods present inherent commerical production difficulties and new methods of preparing such containers are sought.

One solution has been to provide a pinch seam container prepared by vacuum shaping curable flexible sheets and bonding them together at their seam. However, because of this construction, combined with the requirement of an inner hydrocarbon barrier liner, difficulties with seam separation can be experienced when internal pressure is applied.

Therefore, it is an object of this invention to provide an improved composite structure for containing liquid hydrocarbons and a method of preparing such a container.

According to this invention, a container suitable for liquid hydrocarbons comprises an internal pinch seam container, having a hydrocarbon barrier layer as an inner liner prepared by the method which comprises releasably attaching first and second curable polymeric flexible sheets over the apertures of first and second concave molds, and shaping said sheets by applying a pressure differential between the surface of each sheet facing the associated mold and the opposite surface of said sheet, said sheets each comprising a layer of a flexible curable polymeric material adhered to a layer of thickness from about 0.25 mill to about 10 mils of a hydrocarbon barrier material comprising at least one material selected from the group consisting of nylon, polyvinylidene chloride, a copolymer prepared from any two or all three of vinylidene chloride, vinyl chloride and acrylonitrile, or a linear polyester derived from a dicarboxylic acid and a straight chain glycol; after shaping the first sheet, providing an aperture therein through an aperture in the corresponding mold; adhering the peripheries of said first and second sheets having their flexible curable polymeric layers facing each other, before or after shaping the first sheet and providing an opening in one of the sheets to permit inverting the prepared container therethrough; curing the sheets after shaping both to form a pinched seam container; removing the container so produced from the first and second molds, turning the container inside out; and sealing said provided opening in one of the sheets.

It is preferred that the said provided opening in one of the sheets is provided by adhering the peripheries of the first and second sheets except for a portion of sufficient size to permit inverting the prepared container therethrough followed by, after curing the sheets and inverting the container inside out, sealing said unadhered portion of the periphery.

It is understood that the said provided opening can be sealed with a valve, patch, curable bonding cement and other similar means.

The objects and further advantages of this invention will be apparent in view of the following detailed description and drawings.

Figure 2:
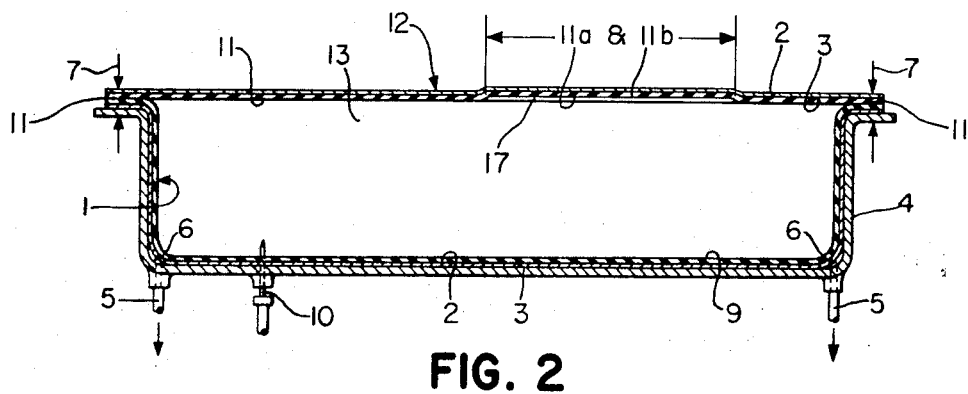
Figure 3:
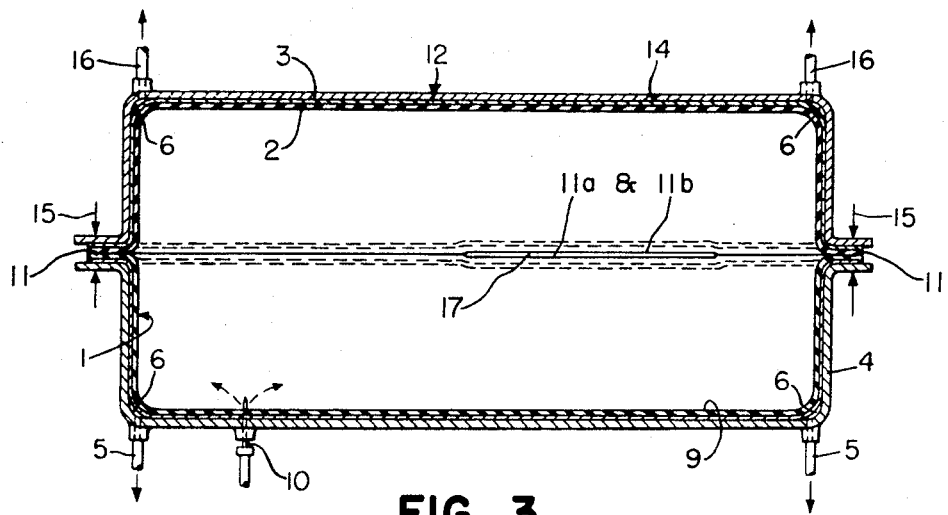
Figure 4:
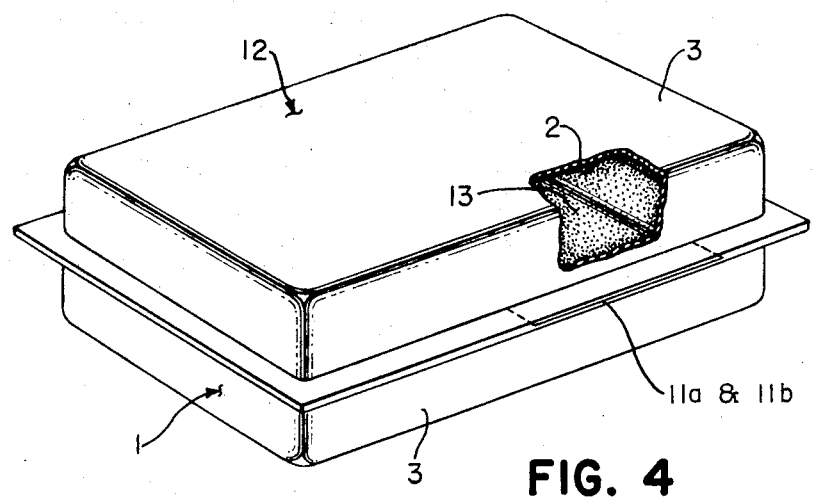
Figure 5:
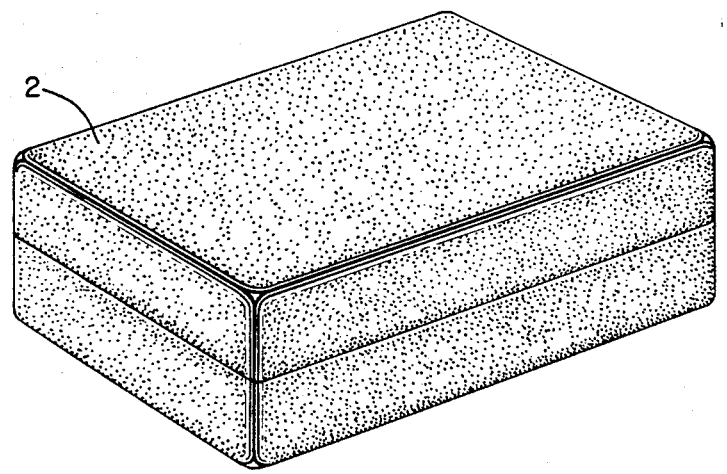

In the drawings, FIG. 1 is a cross-sectional view of a first concave mold having a first sheet of curable polymeric flexible material having a hydrocarbon layer adhered thereto and facing the mold releasably attached, or clamped, over its aperture. FIG. 2 is a cross-sectional view of the first concave mold having the first flexible sheet in a concave position on the concave surface of the mold and a second flexible sheet adhered over the aperture of first concave flexible sheet except for a portion of the periphery large enough to invert the prepared container therethrough and with a vent pipe attached to the formed cavity between the first and second sheets. FIG. 3 is a cross-sectional view of the first concave mold, the first sheet positioned on the concave surface of the first mold, a second concave mold positioned and releasably attached by clamping over a second sheet, and the second sheet in a concave position on the surface of the second concave mold with its hydrocarbon barrier layer facing the second mold. FIG. 4 is a perspective view of the pinched seam container removed from the molds. FIG. 5 is a perspective view of the internal pinched seam container of this invention having a hydrocarbon barrier inner liner formed by inverting the container of FIG. 4 through the opening in its periphery.

Referring to the figures, a first flexible sheet 1 is provided comprising a flexible curable polymeric material 2 such as natural rubber, synthetic rubber, or a polyurethane and preferably a hydrocarbon resistant polymeric material such as a butadiene-acrylonitrile copolymer, with a layer of hydrocarbon barrier material 3 adhered thereto such as nylon, polyvinylidene chloride and polyester types.

A first concave mold 4 is provided having venting tubes 5 attached and connected to a vacuum or reduced pressure source such as a vacuum pump. On the inside surface of the mold are positioned small fibrous pads 6 such as a textile fabric over the openings of the venting tubes 5 to distribute the gas flow and thereby prevent the opening of a vent tube from becoming closed.

The first flexible sheet 1 is releasably attached to the aperture of the first concave mold 4 with clamps 7 to form an enclosed cavity 8 between the first sheet and the first mold with the liquid hydrocarbon barrier layer 3 adhered to the inner surface of the first flexible sheet 1.

A reduced pressure is then applied to the enclosed cavity 8 by applying a vacuum through the vent tubes 5 to actuate the flexible sheet 1 inwardly toward the surface of the first concave mold 4 and thereby form the first sheet in a concave position 9. The fibrous pads 6 in the concave mold covering the openings of the vent tubes 5 prevent the said openings from becoming closed by the flexible sheet. It is preferred that the hydrocarbon barrier surface of the first sheet 1 contacts the surface of the first mold 4 and is molded or shaped thereby.

A vent tube 10 is injected through the first mold surface and first shaped flexible sheet and preferably positioned with a sealant around the vent so that any reduced pressure between the first mold surface and sheet is not substantially affected thereby.

If desired, a coating of curable cement 11 such as a rubber, epoxy, or phenolic type of bonding cement is applied around the periphery of the aperture of the concave first sheet on the surface of the curable polymeric layer except for the portion 11-a.

A second flexible sheet 12 is adhered to the first sheet with the cement coating 11, if desired except for portion 11-b, to define a cavity 13 between the first and second sheets essentially enclosed by the curable polymeric layers of the sheets and vented with the vent tube 10.

A second concave mold 14 is releasably attached with clamps 15 to the second sheet to form an enclosed cavity between the second sheet and second mold. The second mold is fitted with vents 16 with small fiberous pads placed thereover to a vacuum or reduced pressure source such as a vacuum pump. A reduced pressure is applied to the cavity between the second sheet and second mold by attaching the vents 16 to the vacuum source to actuate the second sheet inwardly toward the second mold to shape the second sheet in a concave position. The vent tube 10 provides an air source to allow air to enter the cavity between the sheets, thereby facilitating the inward actuation of the second sheet and maintaining a pressure differential between the second mold surface and the outside surface which is the surface having the curable polymeric layer adhered thereto, of the second flexible sheet.

An insert 17 is placed between the two shaped sheets at their peripheries at position 11-a and 11-b which will not tightly adhere to the curable polymeric layer as it is cured.

Alternately, the two flexible sheets can be first shaped, with the vent tube 10 inserted through one of the shaped sheets, and then adhered with the insert 17 positioned therebetween.

In this position, the molds are placed in a forced air oven and the flexible sheets and curable cement, if used, are cured, with the vent tube 10 essentially equalizing the pressure inside and outside the molds, following which the molds are removed from the oven and the prepared container with its outer pinched seam is removed from the molds.

The insert 17 is removed and the container inverted through the resulting aperture. The aperture is then sealed such as by curing with the aid of bonding cement, if desired.

In the description of the drawings, the flexible sheets were shaped by applying a vacuum or reduced pressure to the cavity between a sheet and a mold member. As an alternative method, the sheets can be shaped by applying a positive pressure to the cavity between the sheets through the vent 10 and allowing gas such as air to escape from the cavities between the sheets and molds 8 and 13 through the vents 5 and 16, in the instance where the sheets are adhered together prior to their shaping, to force or actuate the sheets outwardly to the mold surfaces by the resultant pressure differential between an outer surface of a sheet having a hydrocarbon barrier adhered thereto and a mold surface.

Various methods can be used for adhering the two sheets together. Preferably the sheets are adhered by their tack and cured although the various adhesives and bonding cements can be used, if desired.

The composite structure of this invention having an inner pinched seam and hydrocarbon barrier inner liner can be used to contain various hydrocarbons and their mixtures exemplary of which are petroleum and coal tar distillates and various fueld such as gasoline and kerosene and various lubricating and fuel oils having oiling points at atmospheric pressure ranging from about $-10°$ C. to about $400°$ C. and usually from about $0°$ C. to about $150°$ C. Suitable hydrocarbons are saturated aliphatic, saturated cycloaliphatic, unsaturated aliphatic, unsaturated cycloaliphatic, and aromatic hydrocarbons and mixtures of such hydrocarbons. Representative examples of these and other various saturated hydrocarbons are aliphatic hydrocarbons such as the butanes, the pentanes, the hexanes, the heptanes, the octanes and the nonanes; aromatic hydrocarbons such as benzene, toluene and xylene; saturated cycloaliphatic hydrocarbons such as cyclohexane; and various unsaturated hydrocarbons representative of which is olefins such as the butenes, the pentenes, the hexanes, the heptenes, the octenes, and the nonenes; and diolefins such as the butadienes, the pentadienes, isoprene, the hexadienes, the heptadienes, and the octadienes. Various mixtures of unsaturated, saturated and aromatic hydrocarbons can also be contained.

In the practice of this invention, the flexible sheets used to prepare the composite structure comprise at least one layer of a flexible polymeric material having at least one layer of a hydrocarbon barrier material adhered thereto. Various flexible polymeric materials can be used, representative examples of which are curable flexible materials such as natural rubber and the various synthetic rubbers. Representative of various synthetic rubbers are rubbery polymers of conjugated dienes such as 1,4 addition polymers of 1,3-butadiene and 1,4 addition polymers of isoprene, the rubbery copolymers of butadiene and styrene which contain a major proportion of butadiene, particularly copolymers of butadiene and styrene of the hot and cold SBR type which contain from 60 to about 90 percent by weight of butadiene; rubbery copolymers of butadiene and acrylonitrile; butyl rubber, which is a polymerization product of a major proportion of a mono olefin, such as butylene, and a minor portion of multi-olefin, such as butadiene and isoprene; copolymers of ethylene and propylene; and terpolymers of ethylene, propylene and a minor proportion of a nonconjugated diene and flexible polymers formed by the open ring polymerization of unsaturated alicyclic compounds having from one through three carbon-to-carbon double bonds in the alicyclic ring such as polyoctenamers and polydodecenamers. It is preferred to use a rubbery copolymer of 1,3-butadiene and acrylonitrile such as the type prepared by emulsion polymerization and it is particularly desirable to use such a rubbery copolymer in admixture with from about 10 to about 60 parts of polyvinyl chloride per 100 parts of copolymer. It is understood that such polymers are compounded with various curing agents such as sulfur and peroxides, and with accelerators, antioxidants, fillers, plasticizers, pigments and carbon black.

The hydrocarbon barrier materials for the flexible sheets can be adhered to the flexible sheets by various methods well known to those skilled in the art such as coating a flexible sheet with a solution of the barrier material or, preferably, by adhering a film of the barrier material to the flexible sheet with an adhesive or bonding cement. A curable rubber, epoxy, or phenolic cement, for example, can be used. If the hydrocarbon barrier material is applied as a solution, usually the solution contains from about 1 to about 70 parts by weight of the barrier material per 100 parts by weight of solvent. Dilute solutions of from about 3 to about 20 parts by weight of the barrier material per 100 parts of the solvent are usually preferred where the solutions are to be applied by ordinary methods such as by brushing and by spraying. It is to be appreciated that if the viscosities of the solutions are high, the higher concentrations are usually workable only with difficulty and special procedures must be applied, such as the use of higher temperatures and pressures above atmospheric.

Usually the layer of hydrocarbon barrier material on the flexible sheet has a thickness of from about 0.25 mil to about 10 mils or thicker, although it is usually preferred that the layer has a thickness of from about 0.5 mil to about 5 mils.

Various materials can be used as hydrocarbon barrier materials representative of which are nylon, polyvinylidene chloride, copolymers of vinylidene chloride, vinyl chloride, and acrylonitrile, and certain linear polyesters derived from dicarboxylic acids and straight chain glycols Representative barrier materials as copolymers prepared from vinylidene chloride, vinyl chloride, and acrylonitrile are the polymers comprising from about 50 to about 100 mole percent units derived from vinylidene chloride, from about 0 to about 50 mole percent units derived from vinyl chloride and from 0 to 50 mole percent units derived from acrylonitrile. It is usually preferable that the polymer comprises from about 65 to about 85 mole percent units derived from vinylidene chloride, from about 15 to about 35 mole percent units derived from vinyl chloride, and from 15 to about 35 mole percent units derived from acrylonitrile. A particularly desirable hydrocarbon barrier coat comprises a copolymer of vinylidene chloride and acrylonitrile. The properties of these polymers vary widely depending upon the monomers used, the ratio of monomers used, polymerization conditions, and the degree of polymerization. For example, their tensile strengths at ultimate elongation can range from about 1,500 to about 40,000 pounds per square inch, their ultimate elongations can range from about 0 to about 350 percent, their specific gravities can range from about 1.5 to about 1.75, and their refractive indices can range from about 1.5 to about 1.65. The polymers are usually characterized by being generally soluble in cyclic ethers and ketones and generally insoluble in chlorinated hydrocarbons, aliphatic hydrocarbons, aromatic hydrocarbons and alcohols.

If these polymers are applied to the flexible sheet as a solution, the polymer is usually dissolved or dispersed in various solvents representative of which are ketones and their mixtures which are liquid at about 20° C. Representative of common ketones are acetone and methyl ethyl ketone. Various other liquids can be used as diluents in conjunction with such solvents which themselves are not good solvents for the said copolymer, such as toluene and various alcohols to improve the spraying or drying properties of the copolymers. Representative alcohols are methyl alcohol, ethyl alcohol, isopropyl alcohol, normal propyl alcohol, isobutyl alcohol, normal butyl alcohol, the amyl alcohols, the hexyl alcohols and the heptyl alcohols.

Representative examples of barrier materials of a suitable polymeric linear ester comprises a polymeric polyester of substantially the structure derived from the reaction of at least one dicarboxylic acid selected from the group consisting of terephthalic acid and isophthalic acid with at least one straight chain glycol of the series $HO(CH_2)_nOH$, where "$n$" is an integer from 2 to 10 inclusive, and where the ratio of units of the polymer derived from terephthalic acid to the units derived from isophthalic acid is from about 20:80 to 100:0. Representative of suitable straight chain glycols are ethylene glycol, propylene glycol, 1,4-butane diol, 1,5-pentane diol, 1,6-hexane diol, 1,7-heptane diol, 1,8-octane diol, 1,9-nonane diol and 1,10-decane diol. Usually ethylene glycol, propylene glycol and 1,4-butane diol are preferred. The generally preferred polymeric polyesters are polyethylene terephthalate and those having a ratio of terephthalic acid to isophthalic acid units of from about 50:50 to about 90:10. Suitable methods of preparing such polymers are shown in U.S. Pat. No. 2,965,613. It is also usually desired that the polymeric polyesters used as the hydrocarbon barrier materials of this have an intrinsic viscosity of from about 0.4 to about 0.8 and preferably from about 0.5 to about 0.7. for the purposes of this invention, when a polyethylene terephalate film is used, it is generally preferred that it is an oriented, heat-set film which has been stretched to substantially the same extent in both directions and heat-set at a temperature of from about 150° C. to about 200° C. under tension by methods known to those skilled in the art.

The term "intrinsic viscosity" as used in this specification can be defined as:

$$\frac{\text{specific viscosity} + 3 \ln (\text{relative viscosity})}{4c}$$

where the relative viscosity is defined as:
(solution flow time)/(solvent flow time),
the specific viscosity is defined as:
(relative viscosity − 1);
and $c$ is the concentration of the solution expressed as grams of polymer per 100 milliliters of solution. The intrinsic viscosity measurements are made at 30° C. with a solvent prepared by mixing phenol and symmetrical tetrachloroethylene in a weight ratio of 60:40. Usually a solution concentration of about 0.5 gram of polymer per 100 milliliters of solvent is used.

The nylons when used as the hydrocarbon barrier layer can be applied to the flexible sheets as films and as solutions. Representative of the various nylons are the well-known polyamides referred to as nylons which comprise the reaction product of a linear polymer-forming composition containing amide-forming groups, for example, one consisting essentially of bifunctional molecules each containing two reactive groups which are complementary to reactive groups in other molecules and which comprise complementary amide-forming groups. These polyamides as described above, or as otherwise identified hereinafter, can be obtained, for example, by self-polymerization of a monoaminomonocarboxylic acid or caprolactam, particularly ε-caprolactam, by reacting a diamine with a dibasic carboxylic acid in substantially equimolecular counts, or by reacting a monoaminomonohydric alcohol with a dibasic carboxylic acid in substantially equimolecular amounts, it being understood that reference herein to the amino acids, diamines, dibasic carboxylic acids, and amino alcohols is intended to include the equivalent amide-forming derivatives of these reactants. The preferred polyamides are those having a unit length of at least seven. A further description of the nylons is found in U.S. Pat. Nos. 2,071,250, 2,071,253, 2,130,948 and 2,393,972.

The composite structure prepared by the method of this invention has utility as a container for liquid hydrocarbons and it can be particularly useful as a gasoline tank for vehicles such as automobiles.

The following illustrative example is set forth to further exemplify the objects and advantages of this invention. The parts and percentages are by weight unless otherwise indicated.

EXAMPLE I

Two sheets of a calendered flexible material having a thickness of about 60 mils were prepared having the composition of the following type and labeled as a first sheet and a second sheet.

| Compound | Parts |
|---|---|
| Butadiene-acrylonitrile copolymer (1) | 100 |
| Zinc oxide | 5 |
| Sulfur | 1.5 |
| Magnesium carbonate | 2.25 |
| Carbon black (fine thermal furnace and HAF) | 112 |
| Dioctyl phthalate | 17 |
| Aryl-p-phenylene diamines | 0.5 |
| Polyvinyl chloride resin (2) | 43 |
| Adipic acid ester plasticizer (3) | 35 |
| Accelerator - mixture of a benzothiazone sulfonamide and a benzothiazole disulfide | 1.75 |
| Total | 318.0 |

1. obtained from The Goodyear Tire & Rubber Company, under the tradename Chemigum N–7;
2. obtained from The Goodyear Tire & Rubber Company, under the tradename Pliovic AO–3;
3. obtained from the F. M. C. Corporation, under the tradename Adipal BCA.

To the first and second sheets was adhered to transparent thermoplastic film of nylon of the nylon-6 type made from a polymer of ε-caprolatum having a thickness of about 1 mil (obtained from The Allied Chemical Company, under the tradename Capran) with a curable butadiene-acrylonitrile rubber adhesive labeled as rubber adhesive (A). The curable rubber adhesive had the following type of composition:

| Compound | Parts |
|---|---|
| Butadiene-acrylonitrile copolymer (4) | 72 |
| Zinc oxide | 3.5 |
| Sulfur 1 | |
| Carbon black (SRF) | 21 |
| Accelerator (a benzothiazole disulfide) | 0.5 |
| Phenolic Resin | 83.5 |
| Methyl ethyl keton | 549 |
| Total | 730.5 |

4. obtained from the B.F. Goodrich Company under the tradename Hycar 1001.

A metal mold was prepared and divided into substantially identical first and second concave halves which were identified at a first concave mold and a second concave mold.

The first and second concave molds were about 5-½ inches deep and their rectangular apertures measured about 40 inches by about 15 inches and were fitted with venting tubes in the manner shown in FIGS. 1, 2 and 3. These venting tubes were connected to reduced pressure or vacuum source. The openings of these venting tubes on the inside surface of the molds were covered with loosely woven cotton textile cloth in the manner shown in FIG. 3.

The first flexible sheet was then positioned and clamped over the aperture of the first concave mold with its barrier layer facing inward toward the mold to form a first cavity between the first sheet and surface of the first mold in the manner shown in FIG. 1. The first flexible sheet and mold were heated to about 70° C. by blowing hot air on them to facilitate increasing the flexibility of the said flexible sheet. A vacuum was applied to the first cavity through its venting tubes thereby pulling the first flexible sheet into the first mold cavity with its barrier layer against the mold surface and shaping the first sheet to a concave configuration.

A vent tube was then tightly positioned through the first mold and through the first sheet by puncturing the first sheet. The tight positioning of this vent tube through the first mold and first sheet maintained the reduced pressure or vacuum between the first mold and first sheet, thereby maintaining the concave configuration of the first sheet.

A thin layer of the curable rubber adhesive (A) was coated onto the first sheet around the portion of the first sheet positioned over the periphery of the aperture of the concave mold.

The second flexible sheet was adhered to the first sheet in the manner shown in FIG. 2 to form a pinched seam around their periphery except for a portion large enough through the prepared container can be inverted. In this portion, between the said sheets was positioned a bar of Teflon (trademark of the duPont de Nemours company), about 10 inches long with a thickness of about one-sixteenth inch for this purpose. A second cavity was thus formed located between the two flexible sheets vented by the vent tube inserted through the first mold and the first flexible sheet. The first and second flexible sheets were positioned so that their curable polymeric material surfaces were facing each other.

Over the second sheet was positioned and clamped the second mold substantially over the aperture of the first mold in the manner shown in FIG. 3 to form a third cavity between the second sheet and second mold. The first and second molds with the first and second sheets attached therein were heated to about 70° C. in a hot oven to increase the flexibility of the said sheets and then removed from the oven.

A reduced pressure or vacuum was applied to the third cavity through its venting tubes, thereby pulling the second flexible sheet against the second mold surface and shaping the second sheet. A pressure differential between the second mold surface (third cavity) and outer surface of the second sheet having the hydrocarbon barrier adhered thereto (second cavity) was provided by allowing the vent tube to the second cavity between the first and second sheets to vent outside air into the second cavity as the reduced pressure or vacuum was being applied to the third cavity.

The attached first and second mold halves with the shaped first and second flexible sheets therein where placed in a hot air oven at a temperature of about 120° C. for about 1-½ hours to cure the flexible sheets.

The composite structure was removed from the molds, the Teflon bar removed, and the container inverted through the opening in the periphery in the pinched seam. The said opening was then sealed with a portion of adhesive (A) and heat cured at about 140° C. The container having the internal pinched seam and hydrocarbon barrier inner liner was filled with gasoline and determined to be leak free.

Alternatively, the container could have been prepared by first shaping each of the sheets in their molds, adhering them at their peripheries, curing with the vent being used to equalize pressure, and inverting the container inside out.

The composite structure of this example was prepared by shaping flexible sheets through the application of a pressure differential by applying a reduced pressure in the first and third cavities. It is understood that the pressure differential can also be applied by applying a positive pressure to the second cavity.

In the method of this invention, for strengthening and barrier purposes, the flexible sheets can contain fibrous materials either of the non-woven type or of the extensible woven type. Various fibers can be used such as nylon, cotton and cellulose derivatives, such as rayon.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing an internal pinched seam container suitable for containing liquid hydrocarbons which comprises releasably attaching first and second flexible sheets comprising a flexible curable polymeric layer and a flexible hydrocarbon barrier layer over the apertures of first and second concave molds, and shaping said sheets by applying a pressure differential between the surface of each sheet facing the associated mold and the opposite surface of said sheet, providing an aperture through the first shaped sheet through an aperture in the corresponding mold; adhering the peripheries of said first and second sheets having their flexible curable polymeric layers facing each other, before or after shaping the first sheet and providing an opening in one of the sheets to permit inverting the prepared container therethrough; curing the sheets after shaping both to form a flexible pinched seam container; removing the container so produced from the first and second molds and turning the container inside out through the provided opening, where said curable polymeric layer of said flexible sheets is selected from at least one of the group consisting of natural rubber, rubbery 1,4 addition polymers of 1,3-butadiene, rubbery 1,4 addition polymers of isoprene, rubbery copolymers of butadiene and styrene, rubbery copolymers of butadiene and acrylonitrile, butyl rubber, rubbery copolymers of ethylene and propylene, terpolymers of ethylene, propylene and a minor proportion of a nonconjugated diene, and polymers formed by the open ring polymerization of unsaturated alicyclic compounds having from one through three carbon-to-carbon double bonds in the alicylic ring, and where said barrier layer has a thickness of about 0.25 to about 10 mils and comprises at least one material selected from the group consisting of nylon, polyvinylidene chloride, a copolymer prepared from any two or all three of vinylidene chloride, vinyl chloride and acrylonitrile, or a linear polyester derived from a dicarboxylic acid and a straight chain glycol.

2. The method of claim 1 wherein said provided opening is formed by providing an insert between a portion of the peripheries of the two said flexible uncured sheets to which their uncured polymeric layers will not tightly adhere when cured and removing said insert after curing the sheets.

3. The method of claim 1 wherein the flexible sheet comprises a rubbery copolymer of 1,3-butadiene and acrylonitrile in admixture with from about 10 to about 60 parts of polyvinyl chloride per 100 parts by weight of said rubbery copolymer.

4. The method of claim 3 wherein the hydrocarbon barrier layer on the flexible sheet comprises at least one material selected from the group consisting of nylon, polyvinylidene chloride and a polyester having the structure derived from at least one dicarboxylic acid selected from terephthalic acid and isophthalic acid with at least one straight chain glycol having from two to 10 carbon atoms where the ratio of units of the polyester derived from terephthalic acid to isophthalic acid is from about 20:80 to about 100:0.

* * * * *